United States Patent
Samba et al.

(10) Patent No.: US 7,774,588 B2
(45) Date of Patent: Aug. 10, 2010

(54) HOST BUILD AND REBUILD SYSTEM AND METHOD

(75) Inventors: Basiru Samba, South Huntington, NY (US); Erdim Tanyeri, East Elmhurst, NY (US); Rodrigues Malone Thompson, Jersey City, NJ (US); Jeffrey G. Feltman, Mineola, NY (US); Robert Kozlowski, Tokyo (JP)

(73) Assignee: Morgan Stanley, New York, NY (US)

( * ) Notice: Subject to any disclaimer, the term of this patent is extended or adjusted under 35 U.S.C. 154(b) by 883 days.

(21) Appl. No.: 11/527,322

(22) Filed: Sep. 26, 2006

(65) Prior Publication Data

US 2007/0113066 A1     May 17, 2007

Related U.S. Application Data

(60) Provisional application No. 60/721,315, filed on Sep. 27, 2005.

(51) Int. Cl.
*G06F 15/177* (2006.01)
(52) U.S. Cl. .......................................... 713/1; 713/100
(58) Field of Classification Search ............... 713/1, 713/100; 717/178
See application file for complete search history.

(56) References Cited

U.S. PATENT DOCUMENTS

| | | | | |
|---|---|---|---|---|
| 5,555,416 | A * | 9/1996 | Owens et al. | 717/178 |
| 5,790,780 | A | 8/1998 | Brichta | |
| 6,282,711 | B1 * | 8/2001 | Halpern et al. | 717/175 |
| 6,681,323 | B1 * | 1/2004 | Fontanesi et al. | 713/1 |
| 6,993,448 | B2 * | 1/2006 | Tracy et al. | 702/119 |
| 6,993,642 | B2 * | 1/2006 | Burkhardt et al. | 713/1 |
| 7,203,745 | B2 * | 4/2007 | Sheehy et al. | 709/223 |
| 7,379,982 | B2 * | 5/2008 | Tabbara | 709/220 |
| 2003/0097422 | A1 * | 5/2003 | Richards et al. | 709/217 |
| 2004/0187104 | A1 * | 9/2004 | Sardesai et al. | 717/174 |
| 2006/0217823 | A1 * | 9/2006 | Hussey | 700/87 |

FOREIGN PATENT DOCUMENTS

EP     1 465 064 A2     10/2004

(Continued)

OTHER PUBLICATIONS

International Application No. PCT/US2006/037507, International Search Report, European Patent Office, mailed Apr. 10, 2007.

(Continued)

*Primary Examiner*—Chun Cao
(74) *Attorney, Agent, or Firm*—K&L Gates LLP

(57) ABSTRACT

Methods of building a host computer system. The methods may comprise the steps of discovering hardware components present at the host and determining whether the hardware components are certified. The methods may also comprise the step of determining whether a build of the host is requested. According to various embodiments, a profile may also be downloaded to the host. The profile may comprise an indication of an operating system, an indication of an application, and an indication of a configuration parameter. The methods may also comprise the steps of installing the operating system to the host; installing the application to the host; and configuring the host according to the configuration parameter.

22 Claims, 7 Drawing Sheets

FOREIGN PATENT DOCUMENTS

| | | |
|---|---|---|
| NL | 8 902 501 A | 9/1990 |
| WO | WO 99/59059 | 11/1999 |
| WO | WO 02/079944 A2 | 10/2002 |
| WO | WO 2006/099634 A | 9/2006 |

OTHER PUBLICATIONS

International Application No. PCT/US2006/037507, Written Opinion of the International Searching Authority, European Patent Office, mailed Apr. 10, 2007.

* cited by examiner

HOST BUILD AND REBUILD SYSTEM AND METHOD

CROSS-REFERENCE TO RELATED APPLICATION

This application claims the benefit of U.S. Provisional Application No. 60/721,315 filed on Sep. 27, 2005.

BACKGROUND OF THE INVENTION

As computers and computing devices play an ever increasing role in and out of the workplace, it becomes more important to efficiently configure and maintain networks of computers. Business organizations must be able to configure and maintain computers effectively while at the same time reducing the total cost of ownership. Accordingly, there is a need for systems and methods for building and rebuilding host systems that adequately configure and maintain computers while keeping costs down.

BRIEF DESCRIPTION OF THE FIGURES

Embodiments of the present invention are described below by way of example in conjunction with the following figures, wherein:

FIGS. 3A-3C and 4A-4B are screen shots of a user interface according to various embodiments of the present invention.

SUMMARY

In one aspect, embodiments of the invention are directed to methods of building a host computer system. The methods may comprise the steps of discovering hardware components present at the host and determining whether the hardware components are certified. The methods may also comprise the step of determining whether a build of the host is requested. According to various embodiments, a profile may also be downloaded to the host. The profile may comprise an indication of an operating system, an indication of an application, and an indication of a configuration parameter. The methods may also comprise the steps of installing the operating system to the host; installing the application to the host; and configuring the host according to the configuration parameter.

In another aspect, embodiments of the invention are directed to a system for building a host computer system. The system may comprise a host computer system and at least one database in communication with the host computer system, wherein the at least one database comprises a profile. The profile may comprise, an indication of an operating system, a configuration parameter, an indication of an application. The at least one database may further comprise a runtime that when executed by the host, causes the host to install the operating system, the at least one regional setting and configure according to the configuration parameter.

In yet another aspect, embodiments of the invention are directed to methods of certifying a first computer hardware component. The methods may comprise the steps of providing a user interface and receiving a request for certification through the interface. The request for certification may comprise a description of the first computer hardware component. The methods may also comprise the steps of testing an example of the first computer hardware component and providing a status of the testing in the user interface. The methods may further comprise the step of certifying the first computer hardware component if it meets at least one predetermined standard.

DESCRIPTION

Figure 1:
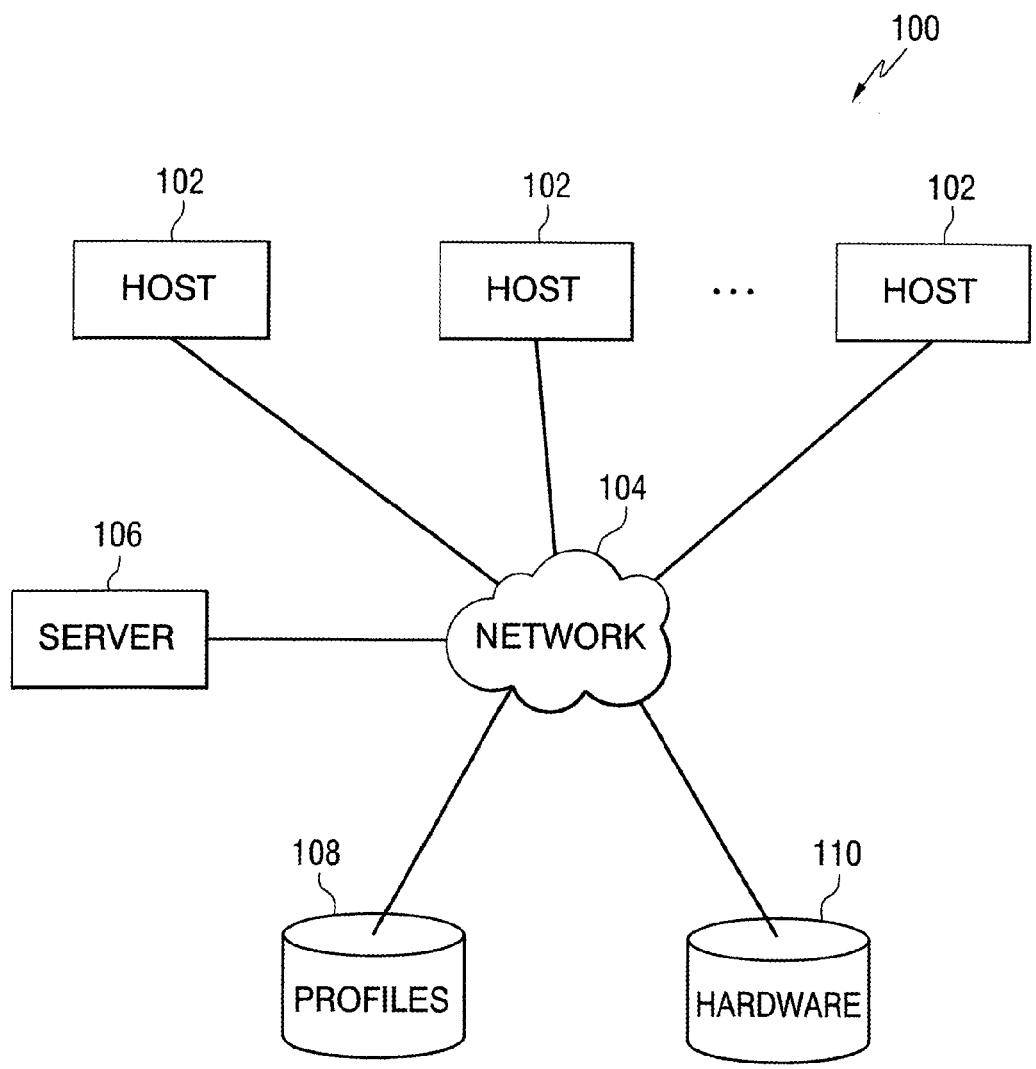
FIG. 1 is a diagram of a system according to various embodiments of the present invention.

FIG. 1 shows a system 100 according to various embodiments of the present invention. The system 100 may include one or more hosts 102, which may include any kind of devices requiring software configuration. In various embodiments, the hosts 102 may be any kind of computers or computing devices such as, for example, desktop computers, laptop computers, servers, handheld computers, etc. In one non-limiting embodiment, the hosts 102 may also include other devices designed with computer functionality such as, for example, telephones, printers, etc.

The system 100 may also include one or more servers such as, for example, server 106. In one non-limiting embodiment, the server 106 may be a Dynamic Host Configuration Protocol (DHCP) server. The server 106 may also manage data in databases 108 and 110. The databases may be in communication with the hosts directly, or via a suitable interface (e.g., an interface executed by a server 106). The database 108 may be a profile database including data that may be used to build or re-build hosts 102 including, for example, executables or runtimes, scripts, profiles, boot images, etc. The hardware database 110 may include drivers and hardware configurations that may be used to build or rebuild hosts 102 according to various embodiments. The hardware database 110 may also include entries for various types of hardware including, for example, processors, monitors, network cards, and other peripherals. The entry for each hardware type may include a certification status for the hardware, for example, as described in more detail below. It will be appreciated that although databases 108 and 110 are shown as two separate databases, their functionality may be incorporated into as few as one database or as many as desired. The various hosts 102, servers 106, and databases 108, 110 may be interconnected via network 104. The network 104 may be any kind of wired, wireless or mixed network including, for example a LAN, a WAN, etc.

Figure 2:
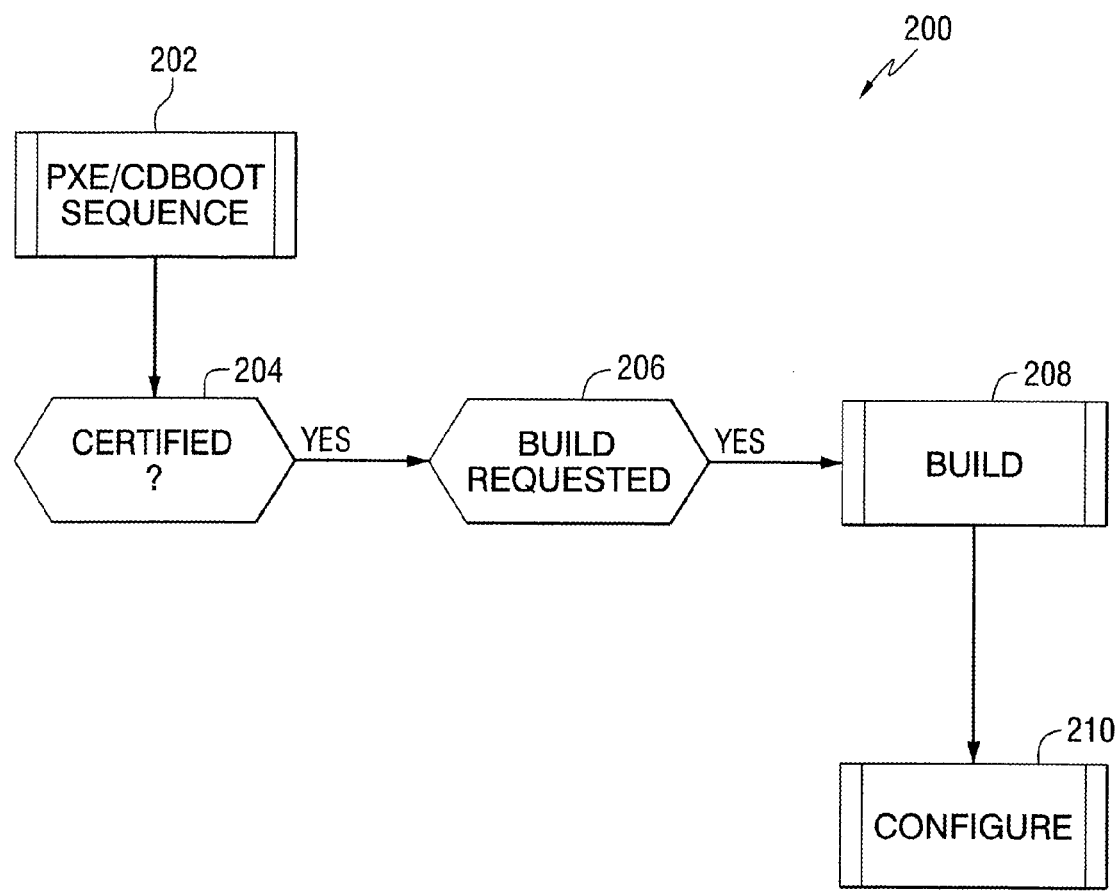
FIG. 2 is a flow chart illustrating a process flow according to various embodiments of the present invention.

FIG. 2 shows a process flow 200 for building or rebuilding a host 102 according to various embodiments of the present invention. At step 202, the host 102 may execute a boot sequence. It will be appreciated that as the boot sequence begins, the host 102 may be in a pre-operating system environment. The boot sequence may begin by loading one or more runtimes or executables (the runtime) to the host 102. The runtime may control the build process by calling various scripts for performing various tasks throughout the build. The scripts may be generated according to any suitable scripting language including, for example, JAVASCRIPT, PERL, etc. In various embodiments, the runtime may access the scripts at locations on the network 104 including, for example, server 106 and/or databases such as 108 and 110. In one non-limiting embodiment, the runtime may be configured to execute in the pre-operating system environment as well as the operating system environment.

In various embodiments, the runtime may be loaded when the host 102 is booted from a compact disk (CD) or other disk. For example, the host 102 BIOS (basic input/output system) may transfer control of the host 102 to the CD or other disk drive, from which the runtime may be loaded. In other various embodiments, the host 102 may be booted according to the Preboot Execution Environment (PXE) protocol. During a PXE boot, the host 102 BIOS may transfer control of the host 102 to a network card included in the host 102. The network card may contact the server 106, which may be configured as a DHCP server according to various embodiments. The server 106 may provide the host 102 with an address on the network 104, for example, an internet protocol (IP) address, allowing the host 102 to access other resources on the network 104. The server 106 may also provide the host 102 with the runtime, which may be present at a network location, e.g. the server 106 and/or a database 108, 110 on the network 104.

Various embodiments may have the capability to build hosts in heterogeneous environments. Heterogeneous environments may include multiple environments that may or may not be in complete contact with each other. Often, at least some of the multiple environments may have differing levels of trust. In various embodiments, the boot method of the host 102 may be selected based on the relative environments. For example, the host 102 may be located at a first environment, and a server 106, database 108, 110 or other device used for the build is located at a second environment that is not trusted in the first environment. In this case, the host 102 may not be able to access the necessary device when booting to the network 104 (e.g., using the PXE protocol). Accordingly, the host 102 may be configured to boot to a CD. In various embodiments, if the host 102 is unable to retrieve a piece of information necessary for a build (e.g., the runtime, operating system and/or application components, etc.), the host 102 may prompt a user, system administrator, etc., to provide the missing runtime, or other information, components etc.

The runtime may initially run in a microkernel environment. The microkernel may be loaded to the host 102 at the same time, or after the runtime. In one non-limiting embodiment, the runtime may call scripts for selecting and downloading a microkernel to the host 102. The microkernel may provide an interface allowing the runtime and scripts limited access to and use of the hardware of the host 102. While the host 102 is operating in the microkernel environment, the runtime may execute a script or scripts for selecting a mini-operating system (mini-OS). The mini-OS may be selected based on the hardware present at the host 102. For example, the mini-OS may be selected to fit at a particular location of the host's 102 memory.

After the mini-OS is selected, it may be downloaded from any suitable location on the network 104, or the disk. Control of the host 102 may be transferred to the section of memory including the mini-OS, implementing a mini-OS environment. The mini-OS environment may allow the runtime and scripts to have increased control over the hardware of the host 102 compared to the microkernel environment. It will be appreciated that the microkernel environment and the mini-OS environment may both be part of the pre-operating system environment.

In the mini-OS environment, the runtime may execute a hardware discovery script that may take an inventory of the hardware components present at the host 102. For example, when the host 102 is a desktop computer, the hardware discovery script may inventory the brand and model of the processor, the motherboard, the BIOS, the disk drives, the network adapter, the video adapter, the monitor, etc. Current drivers for all of the hardware may be discovered and downloaded from resources on the network 104. At decision block 204, it may be determined whether all of the hardware components present are certified for the particualar host 102. A hardware component may be certified when it has been tested for compliance with all of the other hardware components and applications to be used by the host 102, for example. If all hardware present at the host 102 is certified then the build may continue. It will be appreciated that one or more scripts may be executed to determine a list of required hardware drivers based on the hardware inventory generated, for example, as described above.

Also in the mini-OS environment, the runtime may execute one or more scripts for determining whether a build was requested. At decision block 206, it may be determined whether a build or rebuild was requested for the particular host 102. This may avoid unintended rebuilds that may otherwise occur, for example, if a user unintentionally boots the host 102 to PXE or the disk. The script may determine whether the build was requested according to a number of methods. In one non-limiting embodiment, a list of scheduled builds and rebuilds may be located on the network 104, for example, at server 106 or at any of the databases 108, 110. The script may query the server or database containing the schedule to determine if the host 102 is scheduled for rebuild. In another non-limiting embodiment, the script may cause the host 102 to query a user of the host 102 or a system administrator responsible for the build to determine if a build was requested. The system administrator may be, for example, working at another host 102 or server 106. If the build was requested the script may cause the host 102 to prepare and send an e-mail or other message to the system administrator indicating that the build is about to begin.

At block 208, the build of the host 102 may take place. The build may involve loading an operating system, device drivers, and desired applications to the host 102. In various embodiments, the build may proceed according to a predetermined profile. The profile may define the build for a particular host 102. The profile may include information regarding the operating system, applications, etc. that will be installed on the host 102 during the build. The particular profile provided to each host 102 may be determined based, for example, on the location, intended use, etc. of the host 102. It will be appreciated that the profile may be downloaded to the host 102 at any time prior to the build, for example, in the pre-operating system environment.

The software necessary for completing the build may be accessed from one of databases 108, 110 or server 106 over the network 104. At the outset, the runtime may run a script for determining if the build will be a scripted build or an image build. If a scripted build has been chosen, an operating system specific configuration file may be created setting forth the intended configuration of the host 102, for example, according to the profile. Also, a source tree may be generated. The source tree may indicate the intended location of operating system and application components, for example, on a hard drive within the host 102. After the source tree and configuration file have been generated, their location within the host 102 may be disclosed to an operating system specific utility. The operating system specific utility may then install the operating system according to the source tree and configuration file.

If an image build has been chosen, the runtime may execute a script for downloading a build image and laying it down on a hard drive of the host 102. The image may include the names and hard drive locations for necessary components of the build according to the profile. Scripts may then be executed to prepare the image. For example, file names and locations for operating system and application files to be installed on the host 102 may be added to the image. After the image is prepared it may be installed to the host 102. Installing the image to the host 102 may involve downloading all of the files called out in the image to the locations set forth therein. In various embodiments, this may accomplish the installation of the operating system. Also, in various embodiments, the operating system may be installed by an operating system (OS) utility after the image is installed.

After the operating system is installed, either by the script or image method, the host 102 may be booted to the operating system, which may signal the completion of a stage of the build. When the above stage of the build is completed, a script may cause the host 102 to prepare and send another e-mail or message to the system administrator indicating the status of the build.

When the host 102 is booted to the operating system, the runtime may be restarted, for example, during or after the boot. The runtime may call scripts for determining what configuration activities are required for the host 102. At block 210, the runtime may call scripts to configure the host 102. In one non-limiting embodiment, configuring the host 102 may involve software configuration, use configuration, and branding, or look and feel configuration.

Software configuration may include configuring the operating system and application settings, for example, based on the geographical location of the host 102. Use configuration may include modifying the host 102 to comply with its intended use. For example, a host 102 that is configured as a desktop may be configured to optimize its operation while on the network 104. A host that is configured as a laptop or mobile device may be optimized for operation on and off of the network 104. Use configuration may also involve installing certain safeguard applications. For example, various jobs may be installed to monitor and reverse unauthorized configuration changes made to the host 102, for example, by a user. Branding configuration may involve customizing the operating system and other applications to have the desired look and feel. For example, various templates reflecting information about the organization implementing the system 100, such as a logo, may be loaded into word processing and presentation software, screen savers, etc. At the conclusion of the configuration, a script may cause the host 102 to prepare and send an e-mail or other message to the system administrator indicating that the build is complete.

In various embodiments, profiles may be configured to drift over time. For example, a server 106 or other component of the network 100 may monitor version and revision numbers of all of the operating systems, applications, etc. included in a profile. As new versions or revisions of software packages included in a profile are released, e.g., operating systems, applications, etc., the profile may be updated to include the new versions or revisions. Accordingly, the host 102 may be rebuilt, for example, as described above, according to the drifted profile. This may install the most recent versions of software to the host without requiring a system administrator to update each profile whenever a new version or revision number is released. Also, in various embodiments, hosts 102 built according to a given profile may be continuously updated to match drift in the profile. For example, the runtime may continue to reside on the host 102 after a build. The runtime, or other suitable software application, may periodically execute and monitor the host's profile for any drift that may have occurred (e.g., software updates, etc.). If drift has occurred, the runtime may call scripts to download and install any relevant updates.

Also, in various embodiments, the machine personality and user personality of a host 102 may be periodically monitored (e.g., by the runtime or another similar software application). The machine personality may describe the state of non-user parameters of the host 102 including, for example, software packages to be installed, etc. The user personality may describe parameters specific to a certain user including, for example, the location of desktop icons, the default size and location of windows, etc. The personalities of a host 102 may be saved and later used to construct a profile of a new host 102. In this way, the look and feel of a first host 102 may be migrated to a second host 102. It will be appreciated that, in various embodiments, personalities from multiple hosts may be aggregated into one profile.

Figure 3A:
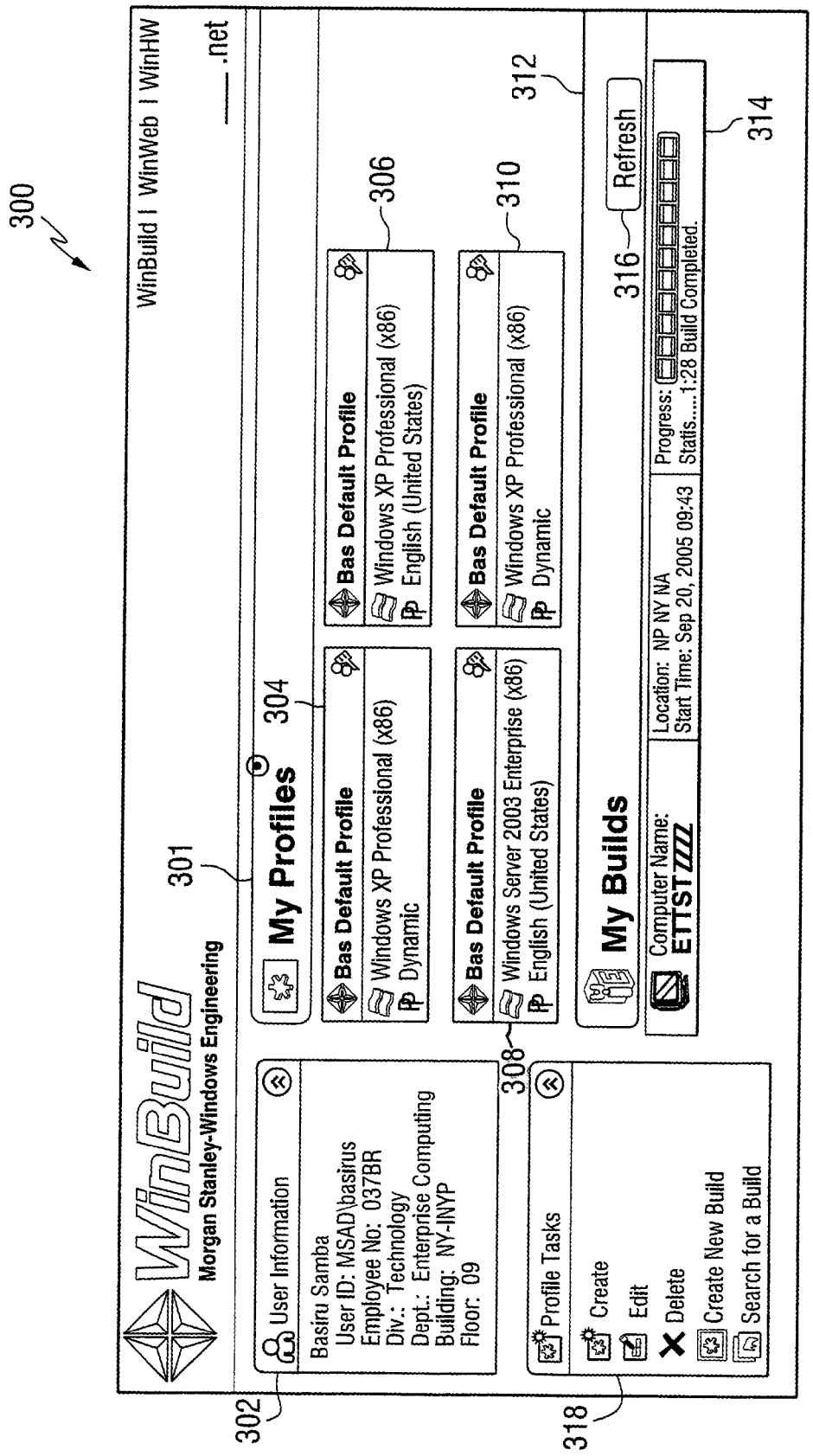

System administrators who have responsibility for building and rebuilding hosts 102 within the system may manage the builds and create profiles and builds through a user interface. For example, FIG. 3A shows a user interface 300 that may be shown to a system administrator according to various embodiments. User information regarding the system administrator may be shown at field 302 including, for example, a name, user ID, employee number, division, department, building and floor. The interface 300 may also include information about various profiles belonging to the system administrator, shown under heading 301. Each profile field 304, 306, 308, 310 may show various information about the profiles including, for example, the operating system and regional settings.

The interface 300 may provide the system administrator with information about ongoing builds, for example, under heading 312. Field 314 shows the status of a build in progress including, for example, the name of the host 102, the location of the host 102, the start time of the build, the progress of the build, the status of the build, etc. The system administrator may select the refresh button 316 to update the field 314. The interface 300 may also allow the system administrator to create and edit profiles and builds, for example, by selecting one of the icons at field 318. Selecting the create or edit icons from field 318 may launch user interface 320 shown in FIG. 3B.

Figure 3B:
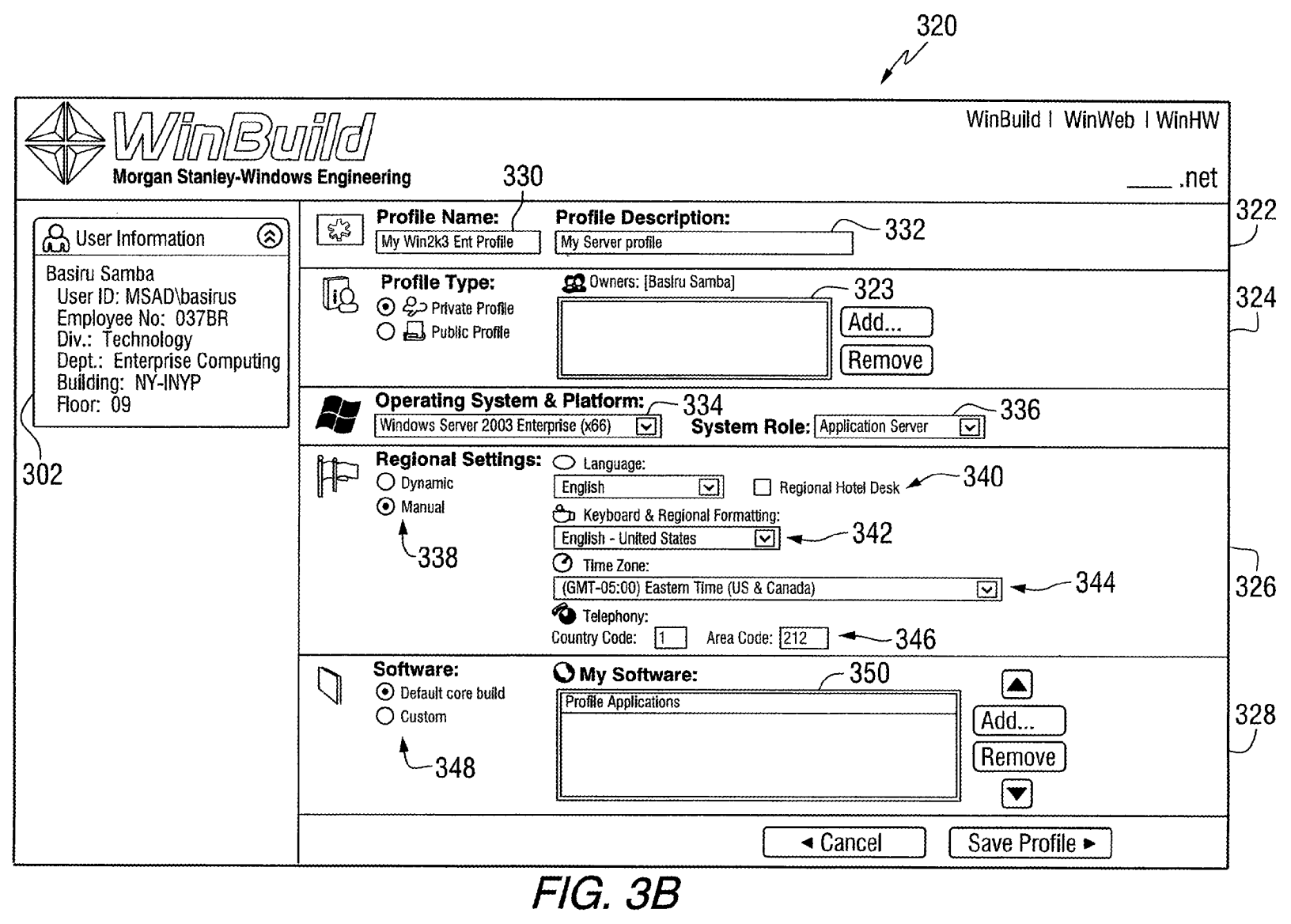

FIG. 3B shows the user interface 320 configured to allow a system administrator to create and or edit a build profile. Under field 322, a name for the profile may be entered at box 330 and a description at box 332. The profile type, and owner or owners may be entered at box 324. For example, the profile may be a public profile that other system administrators may use for builds, or a private profile available only to the system administrator who owns it. Owners of the profile, including, for example, the system administrator who created it, may be listed at field 323. Operating System and Platform field 325 may allow the operating system and role for the host 102 to be entered. The operating system may be any operating system including, versions of the WINDOWS operating system from MICROSOFT, the LINUX operating system, etc. The system role, entered at field 336, may indicate the user intended for hosts 102 built according to the profile. Exemplary system roles include, for example, application server, workstation, etc.

Regional settings for the profile may be entered at field 326. In various non-limiting embodiments, the regional settings may be dynamically configured by selecting the appropriate box at field 338. When the regional settings are dynamically, configured, builds using the profile may cause the host 102 to query a server 106 to learn the host's 102 location, and configure region-specific features accordingly. In other non-limiting embodiments, the regional settings may be manually selected. For example, the language, keyboard format, time zone, and telephone country and area code may be entered at fields 340, 342, 344 and 346 respectively.

Software applications to be installed in builds using the profile may be selected at field 328. For example, a default core build may be selected at field 348. A default core build may install a default selection of applications. If the custom box is selected at field 348, then the system administrator may choose from a set of available applications listed at field 350.

Figure 3C:
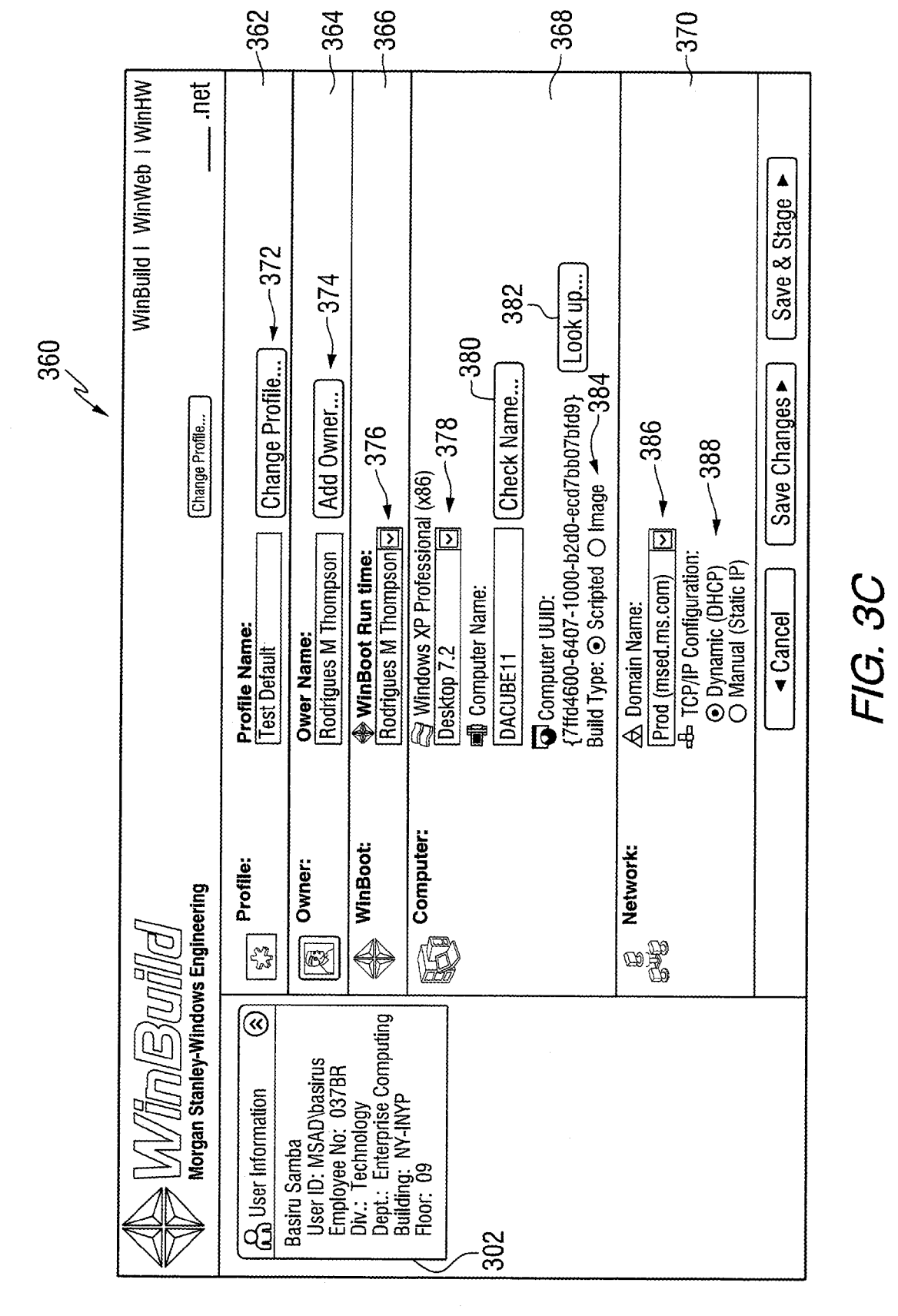

FIG. 3C shows a screen shot of a user interface 360 for configuring a build according to various embodiments. In response to the inputs entered at user interface 360, a boot image may be created. The boot image may be used during the build as described above. Referring to the user interface 360, at field 362, a profile may be selected for the build. For example, selecting the Change Profile button 372 may allow the system administrator to select a profile from a list of available profiles. In one non-limiting embodiment, the profile may have been created through a user interface similar to interface 320 described above. At field 364, the owner of the build may be specified. The owner of the build may be the individual who will be the primary user of the host 102 after the build.

At field 366, the environment for the build may be entered, for example, using drop down menu 376. The environment of the build may define versions of particular software packages that are loaded onto the host 102. For example, builds in a development environment may load the most recent alpha or beta version of applications. Builds in a quality assurance (Q/A) environment may have completed versions of applications, and builds in the production environment may have fully completed and tested versions of applications.

Various other attributes of the build may be selected at field 368. For example, the operating system version may be selected from field 378. A computer name for the host 102 may be selected at field 380 and the computer UUID may be selected at field 382. The build type, e.g., scripted or image, may be selected at field 384.

Network information about the build may be entered at field 370. For example, the host 102 may be configured as a static or dynamic IP device at field 388. At field 386, the domain of the host 102 may be selected. For example, the host 102 may be placed in a development, Q/A, or production domain. The domain of a host 102 may define the other hosts 102 which it may access over the network 104.

Figure 4A:
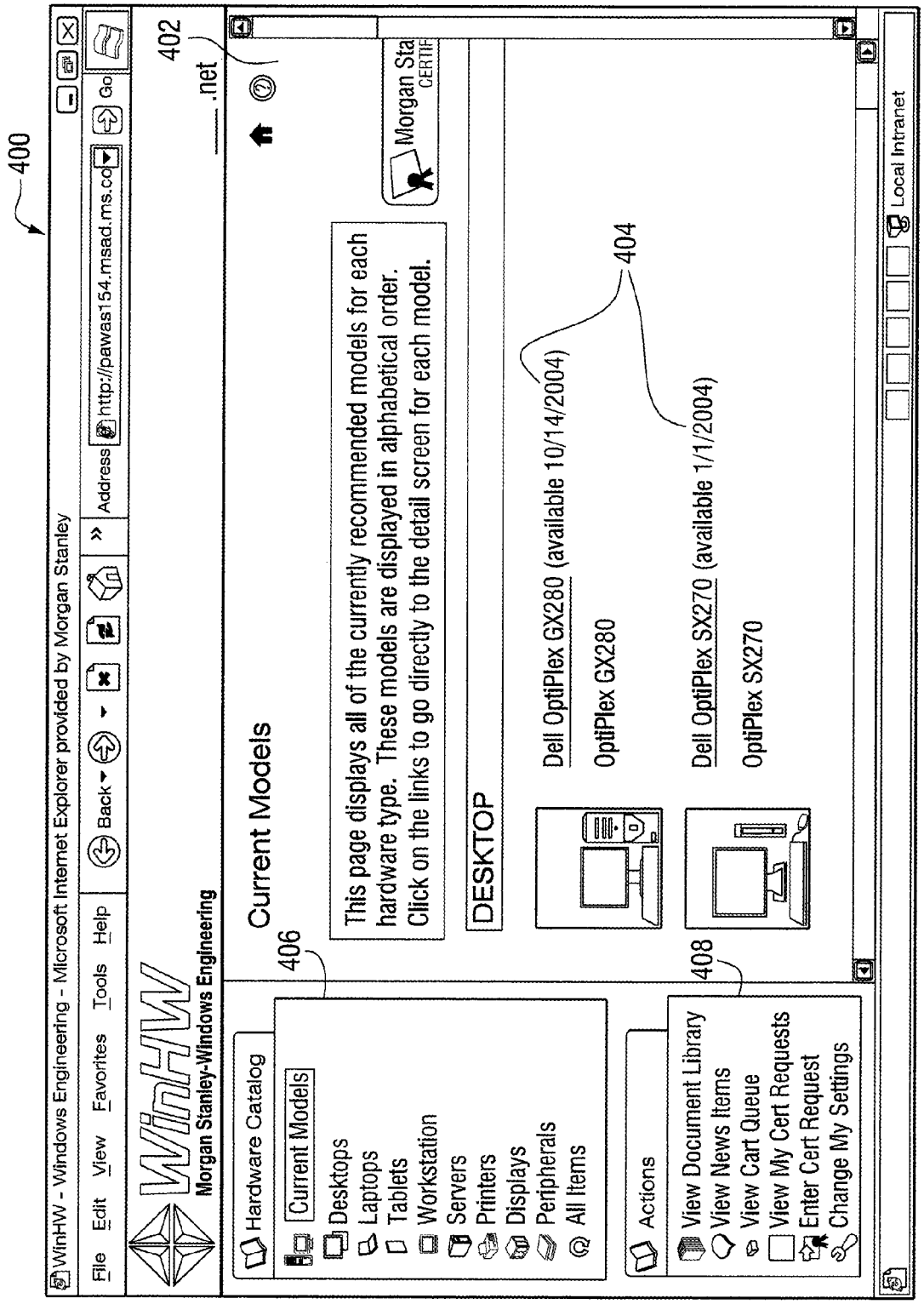

FIG. 4A shows a user interface 400 that may allow a system administrator to manage hardware components according to various embodiments. Field 402 may show a list of hardware components that have been certified. Clicking on a hyperlink 404 for a particular hardware component may provide pricing and availability information for each respective hardware component. Field 406 may allow the system administrator to navigate the field 402 by hardware type. For example, clicking on the desktops icon in field 406 may show certified desktop hardware at field 402. The system administrator may perform hardware related actions by selecting an icon from field 408. Exemplary actions include viewing a document library, viewing news items, viewing the certification queue, viewing certification requests, etc.

Figure 4B:
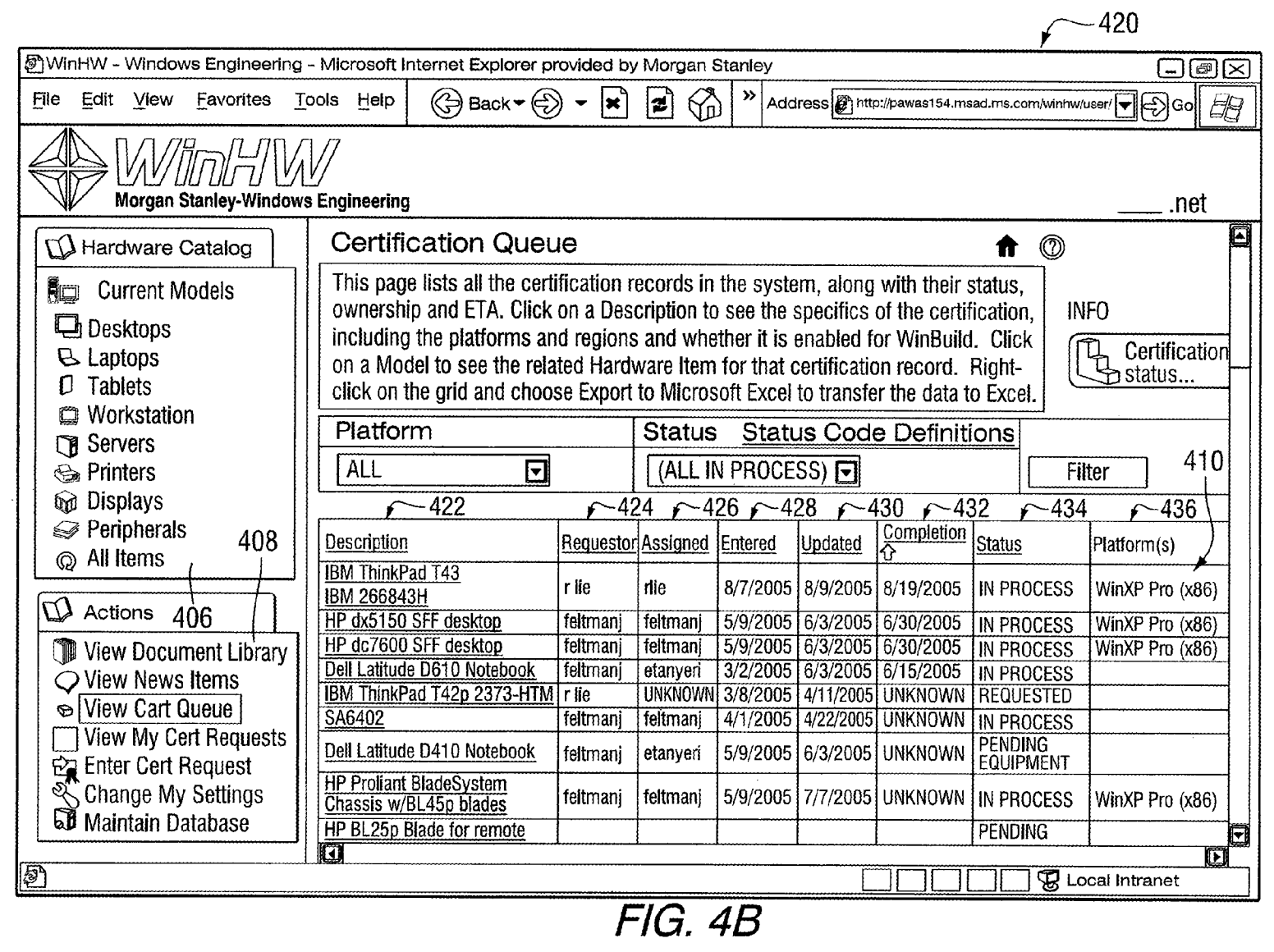

Selecting the Enter Cert Request icon from field 408 may launch interface 420, shown in FIG. 4B. The interface 420 may show the certification queue at field 410. The certification queue may include a listing of hardware components in the process of certification. Various data may be listed about each hardware component including the requestor, the certifier, the date that the request was entered, the last date that the request was updated, the projected completion date, the status of the certification, and the platform of the certification. For example, as shown in FIG. 4B, column 422 displays descriptions of hardware in the certification queue. Column 424 shows the names of the requestors who have requested that the hardware be certified. Column 426 shows the certifiers or test personnel who will certify the hardware. Column 428 shows the dates that the requests were entered into the system. Column 430 shows the date of the most recent updates regarding the requests. Column 432 shows estimated completion dates for the certifications. Column 434 shows the statuses of the certifications; and column 436 shows a platform or platforms that the hardware will be certified for use with.

It will be appreciated that, in various embodiments, after a certification request is made, for example, though the user interface 420, the hardware may be assigned to a certifier. The certifier may then test the hardware, for example, with various drivers, BIOS revisions, operating systems, etc., that may be used in the field. If the hardware passes the certification tests, it may become certified, and may be listed, for example, at user interface 400.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

We claim:

1. A method of building a host computer system, the host computer system comprising at least one processor and an associated computer readable medium, the method comprising:

loading a runtime to the host computer system while the host computer system is in a pre-operating system environment, wherein the runtime is configured to execute in the pre-operating system environment and in an operating system environment;

while the host computer system is operating in the microkernel environment, selecting and downloading, by the host computer system, a mini-operating system;

implementing a mini-operating system environment on the host computer system, by the host computer system, utilizing the downloaded mini-operating system;

executing the runtime, wherein executing the runtime causes the host computer system to:

while the host computer system is operating in the mini-operating system environment:

discover hardware components present at the host computer system;

determine whether the hardware components have been tested for compliance with each other;

determine whether a build of the host computer system is requested by at least one action selected from the group consisting of querying another computer system and querying a system administrator;

download a profile to the host computer system, wherein the profile comprises an indication of an operating system, an indication of an application, and an indication of a configuration parameter;

install the operating system to the host computer system;

after the host computer system is booted to the operating system:
install the application to the host computer system; and
configure the host computer system according to the configuration parameter.

2. The method of claim 1, further comprising booting the host computer system according to a Preboot Execution Environment (PXE).

3. The method of claim 1, further comprising booting the host computer system from a storage device.

4. The method of claim 1, further comprising scheduling the build at a first predetermined time.

5. The method of claim 1, wherein installing the operating system to the host computer system comprises:
creating a configuration file;
creating a source tree;
disclosing the location of the configuration file and the source tree to an operating system utility;
allowing the operating system utility to install the operating system.

6. The method of claim 1, wherein installing the operating system to the host computer system comprises:
downloading an image to the host computer system, wherein the image comprises an image of the operating system;
preparing the image for the host computer system; and
installing the image to the host computer system, wherein installing the image to the host computer system comprises an operating system utility installing the operating system from the image.

7. The method of claim 6, wherein the image also comprises an image of the application.

8. The method of claim 1, wherein determining whether the hardware components are certified comprises determining whether each of the hardware components has been certified for use on the host computer system.

9. The method of claim 1, wherein the configuration parameter comprises a setting of the operating system based on a geographic location of the host computer system.

10. The method of claim 1, further comprising installing a safeguard application having functionality for removing undesired system changes.

11. The method of claim 1, wherein the configuration parameter comprises an intended use for the host computer system.

12. The method of claim 1, wherein configuring the host computer system comprises configuring a look and feel of the at least one application.

13. The method of claim 1, further comprising sending a status message to a system administrator when the build reaches a first predetermined status.

14. The method of claim 13, further comprising sending a second status message to the system administrator when the build reaches a second predetermined status.

15. The method of claim 14, further comprising sending a third status message to the system administrator when the build reaches a second predetermined status.

16. The method of claim 15, wherein the first predetermined status occurs at the beginning of the build and wherein the second predetermined status occurs at the end of the build.

17. The method of claim 1, further comprising periodically checking for changes to the profile; and if an updated profile exists, updating the host computer system according to the updated profile.

18. The method of claim 1, wherein the profile incorporates a user personality derived from a second host.

19. A system for building a host computer system, the system comprising:
a host computer system;
at least one database in communication with the host computer system, wherein the at least one database comprises a profile, and wherein the profile comprises:
an indication of an operating system;
an indication of a microkernel;
a configuration parameter;
an indication of an application; and
wherein the at least one database further comprises a runtime that when executed by the host computer system, causes the host computer system to:
while the host computer system is operating in the mini-operating system environment:
discover hardware components present at the host computer system;
determine whether the hardware components have been tested for compliance with each other;
determine whether a build of the host computer system is requested by at least one action selected from the group consisting of querying another computer system and querying a system administrator;
download the profile to the host computer system;
install the operating system to the host computer system;
after the host computer system is booted to the operating system:
install the application to the host computer system; and
configure the host computer system according to the configuration parameter.

20. The system of claim 19, wherein the configuration parameter comprises at least one regional setting.

21. The system of claim 19, wherein the at least one database is in communication with the host computer system via an interface.

22. The system of claim 19, wherein the at least one database further comprises a copy of the operating system, and a copy of the at least one application.

* * * * *